United States Patent
Glasser et al.

[15] 3,655,409
[45] Apr. 11, 1972

[54] COCONUT PRODUCTS AND PROCESSES

[72] Inventors: George Glasser, Ossining; Joseph Cseri, North Tarrytown, both of N.Y.

[73] Assignee: General Foods Corporation, White Plaines, N.Y.

[22] Filed: Aug. 19, 1969

[21] Appl. No.: 851,469

[52] U.S. Cl. ..............................................99/125
[51] Int. Cl. ...............................................A23l 1/00
[58] Field of Search....................................99/125

[56] References Cited

UNITED STATES PATENTS 1,612,087  12/1926  Zucker ..................................99/125
2,338,184  1/1944  Kaufman ..............................99/125

*Primary Examiner*—Raymond N. Jones
*Assistant Examiner*—J. M. Hunter
*Attorney*—Thomas V. Sullivan, Bruno P. Struzzi and Jerome J. Norris

[57] ABSTRACT

Producing high moisture shelf stable comminuted coconut having greater than usual moisture contents, by subjecting the coconut to pressurized heating sufficient to increase the surface area releasing the pressure and, treating said coconut in a solution comprising polyhydric alcohols, salts and an antimycotic, and mixing said solution treated coconut with sugar blends.

6 Claims, No Drawings

3,655,409

COCONUT PRODUCTS AND PROCESSES

BACKGROUND OF THE INVENTION

This invention relates to a new and improved process for producing high moisture shelf stable non-agglomerated shredded coconut. In particular, the invention is concerned with a new and improved process for heat treatment of coconut, under conditions which create a product such that the coconut structure is fissured and fractured both internally and externally; after which, the perforated coconut having a substantially increased surface area is treated in a solution comprising polyhydric alcohols to stabilize the product against microorganic decomposition; followed by the addition thereto of sugar blends.

In the production and marketing of packaged shredded coconut most typically used for bakery, confectionery, and household purposes, two significant problems are encountered. The texture and palatability of shredded or fine coconut particles is dependent largely upon its moisture content; the dried shreds being brittle and tasteless, whereas the high moisture product has both a softer, less chewy texture and more natural coconut flavor. However, the adverse factor of high mold growth susceptibility is attendant in shredded coconut having high moisture levels. Accordingly, the problem posed in the art is that of providing a sufficiently high moisture content in packaged coconut to insure palatability, but at the same time eliminating the tendency toward undue microorganic decomposition and excessive bacteriological and/or mold growth, without resort to commercial sterilization techniques (canning).

Many food products have heretofore been cooked, primarily in an excess of water, whereupon the food undergoes an enzymatic inactivation, and upon further heat treatment the product is softened or otherwise altered physically or chemically. Significantly, such cooking processes do not promote any material changes in microorganic stability of the foodstuff per se, and storage and packaging other than by commercial sterilization (canning) techniques cannot be utilized.

The primary objective of the invention is to treat shredded coconut under conditions which produce intermediate moisture coconut particles having a moisture content higher than those presently on the market, which have not been packaged by commercial sterilization techniques such as canning; and yet characterized by a softer, less chewy texture and full, more natural coconut flavor.

A yet further object of the invention is to treat both fresh and aged shredded coconut under conditions which lend a more moist eating quality thereto, and yet essentially produces a product stable against microorganic decomposition, such that the need for any further treatment to provide bacteriostasis and protection against development of yeast and/or molds is avoided.

In general, the shredded coconut products presently on the market will contain up to about 19 percent moisture, however, due to dryness these products tend to be difficulty palatable and lacking in desirable coconut texture because coconut taste is in large measure substantially dependent upon its moisture content — the dried shreds being brittle and tasteless, whereas the more moist products have a softer texture and more natural coconut flavor.

Briefly stated, the present invention eliminates the disadvantages attendant to coconut products in current use, by preparing shelf stable intermediate moisture coconut products. The concept of intermediate moisture food products is set forth in U.S. Pat. No. 3,202,514; these products usually have a moisture content in excess of 10 percent and substantially below 75 percent. In general, any significant elevation of the moisture level of many foods above 10 percent will increase their palatability, however, such an increase tends to lead to microbiological decomposition unless the food products are packaged in a hermetically sealed container and commercially sterilized or maintained in a frozen or refrigerated state throughout the period of distribution and storage by the consumer.

One method of preventing microbiological decomposition in foods having moisture in excess of 10 percent is by utilizing the principal of limiting the amount of unbound water capable of supporting microbiological spoilage. This principle is known as the Aw, or the ability of the soluble solids in the food to limit the amount of "free" water available to bacteria; the bacteria's inability to survive this condition; and the subsequent shelf stability or product stability obtained by virtue of this condition.

Since shelf or product stability is the result of having substantially totally inhibited harmful mold as well as bacteriological growth, it has been necessary to incorporate antimycotics such as potassium sorbate in intermediate moisture foods to assist in preventing mold development and ultimate shelf instability.

SUMMARY OF THE INVENTION

It has been found that shelf stable high moisture coconut containing about at least 30 percent moisture may be prepared by cooking shredded coconut in water under pressure; thereafter flash steaming or rapidly releasing the steam pressure to fissure and fracture the coconut structure and thereby increase the external and internal surface area by way of manifold channels.

After the pressure cooking step, the "flashed" coconut may be placed in a strainer to permit excess water to flow off. The increased surface area coconut particles are then thoroughly mixed with about 0.2 parts of a low Aw infusion solution containing about at least 35 percent polyhydric alcohol and an antimycotic, at at least 170° F. Next a blend of dry sugars is intermixed with the solution treated coconut particles, and the entire product is spread out and allowed to cool for about 2 hours, and then drained of excess liquid preparatory to packaging in a polyethylene bag which is sealed to minimize water vapor transmission and stored at room temperature.

The relative concentration of polyhydric alcohols utilized in the low Aw infusion solution employed in accordance with the invention will generally range upwards from around 35 percent, thereby enabling the amount of polyhydric alcohols in the final intermediate moisture coconut to be about 7 percent. In addition to polyhydric alcohols, the low Aw infusion solution will contain a lesser quantity of other stabilizing solutes such as salts. Generally, the Aw infusion solution will contain glycerol as the preferred polyhydric alcohol, and the flash steamed coconut to be treated therewith will have been already treated for a period of time sufficient to thermally deactivate any latent enzymatic and pathogenic activity. The low Aw infusion solution of the invention infuses the increased surface areas within the coconut walls and results in a greater percentage of liquid being held by the coconut than would conventionally be the case. The relative concentration of the polyhydric alcohols and salt used in accordance with the invention will largely be determined by the flavor requirement for the coconut being so treated. Therefore, if the percent of polyhydric alcohol in the shelf stable intermediate moisture coconut product is too high, a distortion of the coconut taste will result; such would also be the case in the instance of too high salt concentrations — accordingly, taste and flavor considerations will to some extent govern both the upper feasible limits of polyhydric alcohol and salt permissible in the final coconut product.

The infusion process subsequent to the flash steaming essentially results in introducing a low Aw solution into the increased surface area coconut, thereby partially substituting polyhydric alcohol and salt solutes in sufficient concentration to substantially increase the osmotic pressure of the resulting solution infused into the final coconut product.

Treatment of the increased surface area coconut in the low Aw infusion solution will preferably be at an elevated temperature of at least 170° F. The quantity of infusion solution in the coconut will be determined by the surface area of the channels in the coconut. The greater the surface area, the higher will be the quantity of absorption of the water bearing soluble solids.

The process finds its broadest application in the treatment of flashed steamed shredded coconut and contemplates treating said coconut to enable packaging aerobically, i.e., packaging under less than commercial sterilization conditions.

The expression "polyhydric alcohol" refers to alcohols with two or more hydroxyl groups, most typically such alcohols as glycerol, propylene glycol, sorbitol, mannitol, and mixtures thereof. However, the expression "contemplated in this invention" will also include a variety of sugar alcohols which may be classed by the number of hydroxyl groups and the general formula $HOCH_2(CHOH) nCH_2CH_3$, where n has values from two to five like tetritols, penitols, hexitols, hepititols, etc., as well as stereoisomers thereof. In general these polyols are water-soluble, crystalline compounds with small optical rotations in water and have a slightly sweet to a very sweet taste. The polyhydric alcohols should be of a low molecular weight so as to offer a substantial effect in increasing the osmotic pressure of the stabilizing solution contained in the intermediate moisture coconut product.

It is a feature of the present invention that the infusion step utilizing the low Aw infusion solution is conducted in a manner whereupon the weight level of solution to flashed steamed shredded coconut will range from 0.2:1 to 1:1 and above; the low Aw solution containing a major percent by weight of water, and minor remaining percentages of polyhydric alcohol, salt, and an antimycotic. The principal objective being to provide the expanded channels in the coconut with greater amounts of moisture by addition of the low Aw solution having water, polyhydric alcohol and salt, which serves to provide stable intermediate moisture soft textured, less chewy coconut products.

Polyhydric alcohols used will be employed at a level in solution so that, after completion of the infusion step and subsequent addition of blended sugars, the intermediate moisture coconut product will have about at least 7 percent polyhydric alcohol; which to an extent is established by the level of salt solute in the low Aw solution. As the level of salt in the cooking solution increases, the level of polyhydric alcohol that might otherwise be employed therein, will be reduced. It has been found that in order to obtain a shelf stable intermediate moisture coconut product of about 32 percent internal moisture, which will not be too sweet or salty, the amounts of polyhydric alcohol and salt contained in the low Aw solution must be such as to give rise to a coconut product having about 7 percent polyhydric alcohol and about 0.8 percent salt solutes. The corresponding low Aw solution necessary for production of proper tasting shelf stable intermediate moisture coconut will usually contain more than about 35 percent polyhydric alcohol and little more than 4 percent salt. The preferred way to treat the shredded coconut products intended for the invention is to mix water with desiccated coconut in a covered vessel which is to be placed in a pressure cooker; heat the cooker for at least 5 minutes at a minimum of 15 p.s.i.g.; withdraw the pressurized cooker from the heat and immediately remove the valve, thereby suddenly releasing steam pressure through the orificed cover. The flashed coconut is then placed on a screen to allow any excess water to flow off. Next, a hot low Aw polyhydric alcohol containing infusion solution is immediately mixed with the flashed steamed drained coconut in a mixer, after which a blend of glucose/fructose is thoroughly intermixed with the low Aw solution treated flashed coconut. The entire product is then distributed over a wide area, covered with foil and allowed to cool and temper for about 2 hours. Thereafter, the product is placed on a screen to drain and packaged in a polyethylene bag at ambient temperatures to provide a product having water activity ranging from 0.81 to 0.84.

Preferred salts which may be used in the invention will be readily ionizable low molecular weight compounds which serve to stabilize the infusion solution, such that the solution has a significant increase in ability to provide bacteriostasis and microorganic stability. Typical salts of use in accordance with the invention are: Sodium chloride, calcium chloride, sodium phosphate, trisodium citrate and like inorganic and organic acid salts commonly used in foodstuffs, and mixtures thereof. Other salts of higher molecular weight and multiple ionization characteristics may be employed, however, with somewhat lesser effect in so far as bacteriostasis and microorganic stability are concerned.

The following examples will more specifically set forth the preferred embodiment of the invention:

EXAMPLE I

A mixture of about one part of water, and about one part of fresh desiccated coconut (3 percent moisture) prepared according to the process of U.S. Pat. No. 2,783,152, is placed in a Pyrex vessel covered with foil; the foil covered vessel is enclosed in a pressure cooker and heated for 5 minutes at 15 p.s.i.g., whereupon the cooker is taken from the heat and the valve suddenly removed until all steam ceases to flow from the pressure cooker orifice. The flashed coconut obtained is placed on a slightly agitated screen and permitted to drain for about 15 seconds. Next, the flashed, drained coconut is placed into a mixing vessel at low speed and about 0.2 parts of a 170° F. solution containing at least 35 percent polyhydric alcohol and an antimycotic is slowly poured into the mixing bowl. Thereafter, about 0.3 parts of a dry blend having equal portions of glucose and fructose is immediately intermixed into the slow mixing solution infused coconut until a homogeneously mixed coconut product is produced. The product is distributed over a large area; covered with foil, and permitted to cool and temper, after which, it is again placed on a screen, permitted to drain, and packaged in a glass vessel at ambient temperatures.

| Ingredient | Percent by Weight | Final Product (%) |
|---|---|---|
| a. Coconut (flash processed) | 53.5 | 29.0 |
| b. Water | 10.5 | 32.0* |
| Glycerol | 6.8 | 7.2 |
| Sodium Chloride | 0.7 | 0.8 |
| Glycerol Monostearate | 0.6 | 0.7 |
| Potassium Sorbate | 0.3 | 0.3 |
| c. Glucose | 13.8 | 15.0 |
| Fructose | 13.8 | 15.0 |
| Totals: | 100.0 | 100.0 |

*Actual % moisture may vary from 30 to 35%, and the water activities in the ranges of stability at 100° F., after 1 week, were between 0.81 to 0.84, without aseptic packaging.

Bacteriological results conducted after storage are shown below:

| Sample | Aw | SPC* | Molds | Yeasts |
|---|---|---|---|---|
| Zero Time | 0.81 | <100 | <10 | <10 |
| 1 week at 100° F | 0.81 | <100 | <10 | <10 |

*Standard Plate Count

Comparable moisture and Aw readings of other coconut products tested follow:

| Sample Type | Moisture | Aw |
|---|---|---|
| Shredded (Canned and prepared according to processes of U.S. Pat. No. 2,338,184 except that moisture content is higher) | 19.5 | 0.85 (molds in a week to 14 days if uncanned) |
| Flash Control I (Water + Coconut without heating) | 34.5 | 0.89 |
| Flash Control II (5 min. boil at atmospheric conditions, water + coconut) | 33.5 | 0.87 |
| Flash Experiment of Example 1 (5 min. cook at 15 p.s.i.g. & steamed flashed) | 32.0 | 0.83 |

In all cases of the control preparation where no flashing procedure was carried out, the Aw (at equivalent moisture content with the product of Example I) was found to be 4 to 6 percent Aw units higher in value. Moreover, even though the products of Controls I and II, had moisture contents comparable to or higher than the product of Example I, the high Aw prevented shelf stability.

The example next following will set forth the preferred embodiments of preparing shelf stable high moisture aged coconut (coconut prepared according to U.S. Pat. No. 2,783,152 and stored for about at least 12 months). The embodiments of this example is significant inasmuch as the procedure of Example I only provides a shelf stable high moisture shredded coconut product when utilizing "fresh" coconut (coconut prepared according to U.S. Pat. No. 2,783,152 and stored for 3 to 5 months). If aged coconut is utilized in the process of Example I a product having an Aw of 0.90 and higher, and a moisture content of about 34 percent results; and this product is not shelf stable.

EXAMPLE II

A mixture of about one part of aged desiccated shredded coconut (about 3 percent moisture) prepared according to the process of U.S. Pat. No. 2,783,152, is, after soaking for 10 minutes in 0.75 parts of water, placed in a Pyrex vessel covered with foil; the foil covered vessel is enclosed in a pressure cooker and heated for 5 minutes at 15 p.s.i.g., whereupon the cooker is taken from the heat and the valve immediately removed until all steam ceases to flow from the pressure cooker orifice. Next, the flashed coconut is placed into a mixing vessel at low speed and about 0.2 parts of 170° F. solution containing at least 40 percent polyhydric alcohol and an antimycotic is slowly poured into the mixing bowl. Thereafter, about 0.3 parts of a dry blend having equal portions of dextrose and fructose is immediately added to the slow mixing solution infused coconut until a homogeneously mixed coconut product is produced. The product is distributed over a large area; covered with foil, and permitted to cool and temper for about 3 hours, and then packaged in a glass vessel at ambient temperatures.

| Ingredient | Percent by Weight |
|---|---|
| a. Coconut (flash processed) | 50.6 |
| b. Water | 8.5 |
| Glycerol | 7.7 |
| Sodium Chloride | 0.8 |
| Glycerol Monostearate | 0.7 |
| Potassium Sorbate | 0.3 |
| c. Dextrose | 15.7 |
| Fructose | 15.7 |
| | 100.0 |

The final coconut product's Aw was found to be 0.84 while its moisture content was about 30 percent. Moreover, the process of this example requires no pour-off or draining of excess liquid as did Example I.

It has been found that rapid bacteriological spoilage will take place at Aw's above 0.85. Below that level, growth is generally inhibited, but there may be occasional organisms that will grow at Aw's below 0.85. In general, Aw's in the range of 0.80 to 0.85 are safe based on the tests conducted.

Another important factor for microbiological stability, especially mold and yeast inhibition, is the type and amounts of antimycotics used in the coconut. The formula given uses about 0.3 percent potassium sorbate as the antimycotic system. These levels have been found to be effective in the intermediate moisture coconut products. However, lower levels would also be effective.

What is claimed is:

1. A process for producing shelf stable comminuted coconut products having a moisture content of about at least 30 percent, comprising (A) cooking desiccated coconut in water under pressure; (B) suddenly releasing said pressure, and allowing the coconut to drain; (C) mixing the drained coconut with a heated solution containing at least 35 percent polyhydric alcohol, salt to provide bacteriostasis, and an antimycotic in amounts sufficient to prevent mold growth; (D) homogeneously intermixing a blend of sugars into said coconut; and (E) allowing the coconut product to cool and temper.

2. The process of claim 1 wherein the desiccated coconut is cooked for at least 5 minutes at a minimum pressure of 15 p.s.i.g., and the blend of sugars is selected from the group consisting of glucose, fructose, dextrose and mixtures thereof.

3. The process of claim 1 wherein the salt present in the solution is selected from the class of readily ionizable salts.

4. The process of claim 1 wherein the desiccated coconut is fresh coconut.

5. The process of claim 1 wherein the desiccated coconut is aged coconut.

6. The product produced by the process of claim 1.

* * * * *